United States Patent
Komiya et al.

(10) Patent No.: US 9,831,756 B2
(45) Date of Patent: Nov. 28, 2017

(54) SWITCHING POWER SUPPLY DEVICE, AND INVERTER, CONVERTER, AIR CONDITIONER, SOLAR POWER CONTROLLER, AND AUTOMOBILE EMPLOYING SAME

(75) Inventors: Kenji Komiya, Osaka (JP); Shuji Wakaiki, Osaka (JP); Akihide Shibata, Osaka (JP); Hiroshi Iwata, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 899 days.

(21) Appl. No.: 13/610,417

(22) Filed: Sep. 11, 2012

(65) Prior Publication Data

US 2013/0083580 A1  Apr. 4, 2013

(30) Foreign Application Priority Data

Sep. 30, 2011 (JP) .................... 2011-217216
Jun. 27, 2012 (JP) .................... 2012-144566

(51) Int. Cl.
H02M 3/158 (2006.01)
H02M 1/088 (2006.01)
H02M 7/5387 (2007.01)
H02M 1/00 (2006.01)

(52) U.S. Cl.
CPC ......... *H02M 1/088* (2013.01); *H02M 3/1582* (2013.01); *H02M 7/5387* (2013.01); *H02M 3/1588* (2013.01); *H02M 2001/0051* (2013.01); *Y02B 70/1466* (2013.01); *Y02T 10/7258* (2013.01)

(58) Field of Classification Search
CPC ......... H02M 2001/0051; H02M 3/156; H02M 3/157; H02M 3/158; H02M 3/1582; H02M 3/1588; H02M 1/088; H02M 7/5387

USPC ............... 363/15–17, 37, 40, 55, 95, 71; 323/282–285, 234

See application file for complete search history.

(56) References Cited

U.S. PATENT DOCUMENTS 5,684,688 A * 11/1997 Rouaud et al. ............... 363/132
5,731,694 A *  3/1998 Wilcox et al. ................ 323/287
6,226,192 B1 *  5/2001 Yamanaka et al. ........ 363/56.01
6,297,596 B1 * 10/2001 Kajihara ....................... 315/160

(Continued)

FOREIGN PATENT DOCUMENTS

| JP | 2008-193839 | 8/2008 |
| JP | 2010-29019 | 2/2010 |
| WO | WO2010150549 | * 12/2010 |

*Primary Examiner* — Emily P Pham
*Assistant Examiner* — Shahzeb K Ahmad
(74) *Attorney, Agent, or Firm* — Morrison & Foerster LLP

(57) ABSTRACT

The switching power supply device is provided with a high-withstand voltage first transistor, a first electrode of which being connected to a first node; a low-withstand voltage second transistor, a first electrode of which being connected to a second electrode of the first transistor, and a second electrode of which being connected to a second node; and a drive circuit. Each of the first and second transistors has a parasitic diode connected in the forward direction between the second and first electrodes. The drive circuit, in a case where electrical current is to flow from the first node to the second node, turns on the first and second transistors, and, in a case where electrical current is to flow from the second node to the first node, turns on the first transistor, and turns off the second transistor.

22 Claims, 8 Drawing Sheets

(56) References Cited

U.S. PATENT DOCUMENTS

| | | | |
|---|---|---|---|
| 7,852,056 B2* | 12/2010 | Nishida | 323/282 |
| 2005/0218876 A1* | 10/2005 | Nino | 323/282 |
| 2010/0283514 A1* | 11/2010 | Soeno et al. | 327/109 |
| 2010/0321966 A1* | 12/2010 | Mochikawa et al. | 363/123 |
| 2011/0228564 A1* | 9/2011 | Uruno et al. | 363/17 |
| 2012/0020137 A1* | 1/2012 | Abe | 363/132 |
| 2012/0087167 A1* | 4/2012 | Kuzumaki et al. | 363/131 |

* cited by examiner

SWITCHING POWER SUPPLY DEVICE, AND INVERTER, CONVERTER, AIR CONDITIONER, SOLAR POWER CONTROLLER, AND AUTOMOBILE EMPLOYING SAME

This nonprovisional application claims priority under 35 U.S.C. §119(a) on Patent Application No. 2011-217216 filed in Japan on Sep. 30, 2011 and Patent Application No. 2012-144566 filed in Japan on Jun. 27, 2012, the entire contents of which are hereby incorporated by reference.

BACKGROUND OF THE INVENTION

1. Field of the Invention

This invention relates to a switching power supply device, and in particular relates to a switching power supply device that experiences reduced switching loss; and to an inverter, converter, air conditioner, solar power controller, and automobile employing same.

2. Description of Related Art

In the past, there have been cases in which a MOS transistor parasitic diode is employed as a freewheeling diode in an inverter. In such cases, when electrical current flows back in the forward direction to the parasitic diode, and a power supply voltage is applied in the reverse direction to the parasitic diode, recovery current (reverse recovery current) flows to the parasitic diode, generating a large switching loss.

Japanese Laid-Open Patent Application 7-264876 discloses a method of preventing flow of recovery current by connecting a backflow prevention diode in the forward direction between a node on the high-voltage side and the drain of the MOS transistor, as well as connecting a freewheeling diode in the forward direction between the source of the MOS transistor and node on the high-voltage side.

Japanese Laid-Open Patent Application 2010-29019 discloses a method of preventing flow of recovery current by serially connecting two MOS transistors between a node on the high-voltage side and a node on the low-voltage side, and connecting a high-withstand-voltage freewheeling diode in the forward direction between a node on the low-voltage side and a node on the high-voltage side.

However, a problem encountered in Japanese Laid-Open Patent Application 7-264876 is that conduction loss is generated in the backflow prevention diode. A problem encountered in Japanese Laid-Open Patent Application 2010-29019 is that costs are high, due to the need to furnish two MOS transistors and a high-withstand-voltage freewheeling diode.

SUMMARY OF THE INVENTION

Accordingly, it is a principal object of the present invention to offer a highly efficient, low-cost switching power supply device, and an inverter, converter, air conditioner, solar power controller, and automobile employing the same.

The switching power supply device according to the present invention is provided with a first transistor, a first electrode of which being connected to a first node; and a second transistor, a first electrode of which being connected to a second electrode of the first transistor, and a second electrode of which being connected to a second node. Each of the first and second transistors has a parasitic diode connected in the forward direction between the second and first electrodes. The withstand voltage between the first and second electrodes of the first transistor is higher than the withstand voltage between the first and second electrodes of the second transistor. The switching power supply device is further provided with a drive circuit that, in a case where electrical current is to flow from the first node to the second node, turns on the first and second transistors, and in a case where electrical current is to flow from the second node to the first node, turns on the first transistor, and turns off the second transistor. Consequently, there is substantially no flow of electrical current to the parasitic diode of the high-withstand voltage first transistor, and therefore recovery current of the high-withstand voltage first transistor is small. Moreover, the recovery current of the low-withstand voltage second transistor is typically smaller than the recovery current of the high-withstand-voltage transistor. Therefore, the recovery current can be reduced, and higher efficiency of the switching power supply device can be attained. Moreover, because there is no need to furnish a separate high-withstand voltage freewheeling diode, lower cost of the switching power supply device can be attained.

Another switching power supply device according to this invention is provided with a first transistor, a first electrode of which being connected to a first node; and a second transistor, a first electrode of which being connected to a second electrode of the first transistor, and a second electrode of which being connected to a second node. Each of the first and second transistors has a parasitic diode connected in the forward direction between the second and first electrodes. The withstand voltage between the first and second electrodes of the first transistor is higher than the withstand voltage between the first and second electrodes of the second transistor. The switching power supply device is further provided with a drive circuit that, in a case where electrical current is to flow from the first node to the second node, turns on the first and second transistors, and in a case where electrical current is to flow from the second node to the first node, turns on the first transistor, and turns on the second transistor when electrical current has begun to flow from the second node to the first node, and turns off the second transistor before electrical current ceases to flow from the second node to the first node. In this case, synchronous rectification is performed, and therefore efficiency can be increased further.

In preferred practice, the drive circuit presents a control electrode of the first transistor with a voltage that is higher than a voltage obtained by adding a threshold voltage of the first transistor to the voltage of the second node, and turns on the first transistor. In this case, a voltage differential between the first electrode and the second electrode of the first transistor can be substantially eliminated, and therefore the electrical current flowing to the parasitic diode of the first transistor can be reduced, making it possible for the effect of reducing the recovery current of the high-withstand voltage first transistor to be exhibited at a maximum level.

Moreover, in preferred practice, the drive circuit includes a capacitor connected between the control electrode of the first transistor and the second node; and a diode, a cathode of which being connected to the control electrode of the first transistor, and an anode of which receiving a voltage greater than the threshold voltage of the first transistor. In this case, even if the voltage of the second node fluctuates when the switching power supply device is operated, due to capacitive coupling by the capacitor, a potential sufficient to turn on the first transistor can continue to be presented to the control electrode of the first transistor, and therefore the recovery current of the first transistor can be reliably reduced.

Moreover, in preferred practice, the drive circuit turns on the first transistor when the switching power supply device is operated, and turns off the first transistor when the switching power supply device is idle. In this case, because the first transistor is off when the switching power supply device is idle, safety can be improved.

Moreover, in preferred practice, the drive circuit includes a capacitor connected between the control electrode of the first transistor and the second node; a diode, the cathode of which being connected to the control electrode of the first transistor; and a third transistor, a first electrode of which receiving a voltage greater than the threshold voltage of the first transistor, and a second electrode of which being connected to the anode of the diode; and, when the switching power supply device is operated, turns on the third transistor and turns on the first transistor, or when the switching power supply device is idle, turns off the third transistor and turns off the first transistor. In this case, even if the voltage of the second node fluctuates when the drive circuit is operated, due to capacitive coupling by the capacitor, a potential sufficient to turn on the first transistor can continue to be presented to the control electrode of the first transistor. On the other hand, when the switching power supply device is idle, the third transistor turns off, whereby high voltage ceases to be applied to the control electrode of the first transistor, and due to capacitive coupling by the capacitor, the potential of the control electrode of the first transistor remains stable at a level close to the potential of the second node. Because of this, the first transistor can be prevented from turning on improperly due to a surge or the like, and safety can be further improved.

Moreover, in preferred practice, there is further provided a coil for accumulating and discharging electromagnetic energy, and one terminal of the coil is connected to the first or second node. In this case, a high-efficiency inverter or converter can be realized.

Moreover, in preferred practice, there is further provided a transformer that includes primary and secondary windings, and one terminal of the primary winding is connected to the first or second node. In this case, a high-efficiency inverter or converter can be realized.

Moreover, in preferred practice, there is further provided a zener diode, an anode of which being connected to the second electrode of the second transistor, and a cathode of which being connected to the first electrode of the second transistor. In this case, the potential of the second electrode of the first transistor and of the first electrode of the second transistor, specifically, an intermediate potential, can be prevented from rising appreciably in relation to the potential of the second node. Specifically, the potential difference between the first and second electrodes of the low-withstand voltage second transistor can be reduced. Consequently, the reliability of the second transistor can be improved, recovery current can be reduced by lowering the withstand voltage of the second transistor, and even higher efficiency of the switching power supply device can be attained.

Yet another switching power supply device according to this invention is provided with a first transistor, a first electrode of which being connected to a power supply voltage line; a second transistor, a first electrode of which being connected to a second electrode of the first transistor, and a second electrode of which being connected to an output node; a third transistor, a first electrode of which being connected to the output node; a fourth transistor, a first electrode of which being connected to a second electrode of the third transistor, and a second electrode of which being connected to a reference voltage line. Each of the first to fourth transistors has a parasitic diode connected in the forward direction between the second and first electrodes. The withstand voltage between the first and second electrodes of the first transistor is higher than the withstand voltage between the first and second electrodes of the second transistor. The withstand voltage between the first and second electrodes of the third transistor is higher than the withstand voltage between the first and second electrodes of the fourth transistor. The switching power supply device is further provided with a drive circuit that, in a case where electrical current is to flow from the power supply voltage line to the output node, turns on the first and second transistors, in a case where electrical current is to flow from the output node to the power supply voltage line, turns on the first transistor, and turns off the second transistor, in a case where electrical current is to flow from the output node to the reference voltage line, turns on the third and fourth transistors, and in a case where electrical current is to flow from the reference voltage line to the output node, turns on the third transistor, and turns off the fourth transistor. In this case, a high-efficiency inverter can be realized.

In preferred practice, the drive circuit includes a capacitor connected between the control electrode of the first transistor and the output node; and a diode, a cathode of which being connected to the control electrode of the first transistor, and an anode of which being connected to the control electrode of the third transistor. The anode of the diode receives a voltage that is higher than each of the threshold voltages of the first and third transistors. In this case, the first and third transistors are turned on, the electrical current flowing to the parasitic diode of the first and third transistors is lowered, and the recovery current of the high-withstand voltage first and third transistors can be reduced. Furthermore, even if the voltage of the output node fluctuates when the switching power supply device is operated, due to capacitive coupling by the capacitor, a potential sufficient to turn on the first transistor can continue to be presented to the control electrode of the first transistor, and therefore the recovery current of the first transistor can be reliably reduced.

The converter according to this invention is provided with the aforementioned switching power supply device, and is adapted to step up or step down DC voltage.

The inverter according to this invention is provided with the aforementioned switching power supply device, and is adapted to convert DC power to AC power.

The air conditioner according to this invention is provided with the aforementioned switching power supply device.

The solar power controller according to this invention is provided with the aforementioned switching power supply device.

The automobile according to this invention is provided with the aforementioned switching power supply device.

DETAILED DESCRIPTION OF PREFERRED EMBODIMENTS

First Embodiment

Figure 1:
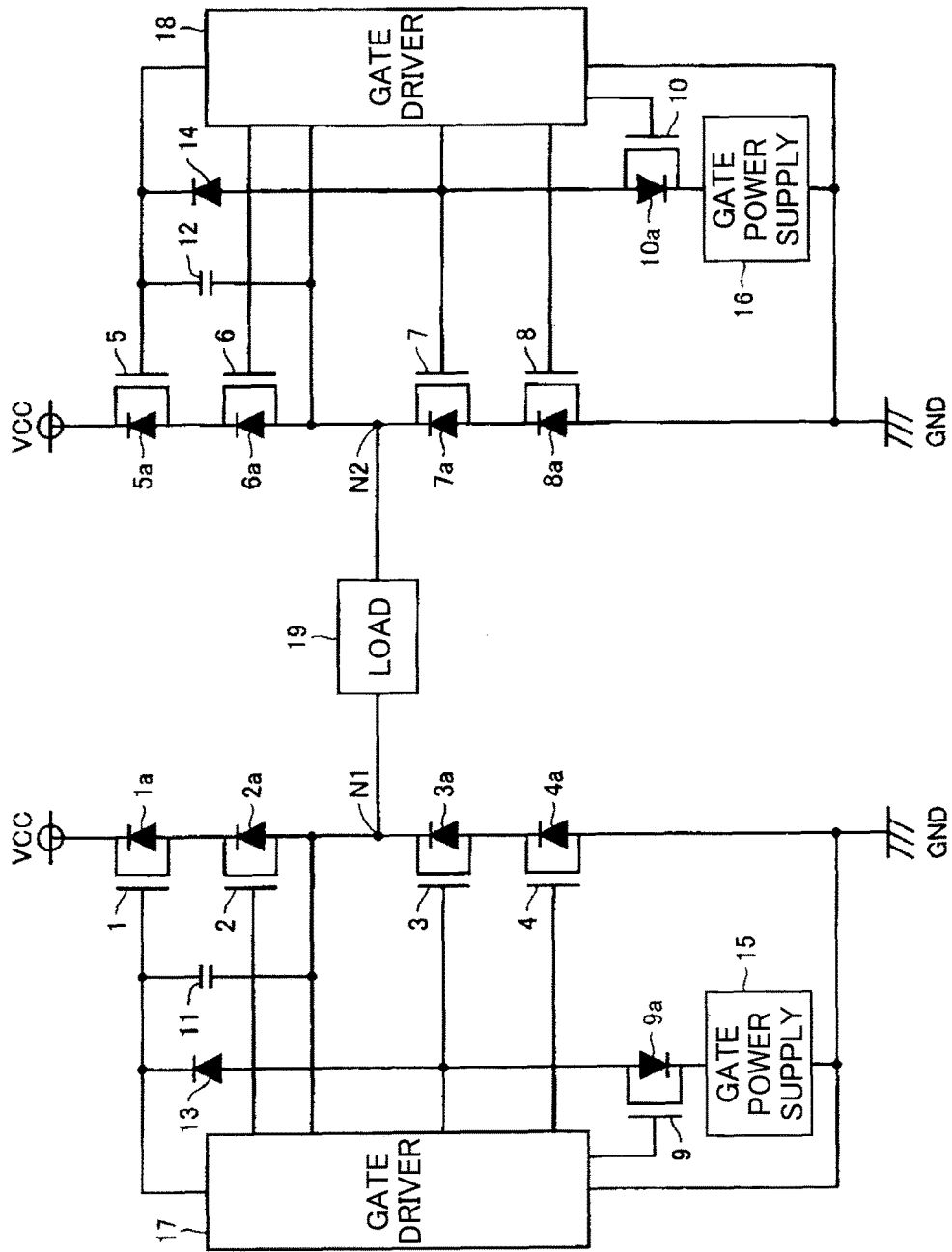
FIG. 1 is a circuit block diagram showing a configuration of an inverter according to a first embodiment of this invention.

As shown in FIG. 1, the inverter according to a first embodiment of the present invention is provided with N-channel MOS transistors 1 to 10, capacitors 11 and 12, diodes 13 and 14, gate power supplies 15 and 16, and gate drivers 17 and 18. The transistors 1 to 10 respectively incorporate parasitic diodes 1a to 10a.

The anodes of the parasitic diodes 1a to 10a are respectively connected to the sources of the corresponding transistors 1 to 10, while the cathodes of the parasitic diodes 1a to 10a are respectively connected to the drains of the corresponding transistors 1 to 10.

Each of the transistors 1, 3, 5, and 7 is a high-withstand-voltage transistor in which the source-drain withstand voltage is 600 V, for example. Each of the transistors 2, 4, 6, and 8 is a low-withstand-voltage transistor in which the source-drain withstand voltage is 30 V, for example. Typically, the recovery current of the low-withstand-voltage transistors 2, 4, 6, and 8 is lower than the recovery current of the high-withstand-voltage transistors 1, 3, 5, and 7. Each of the parasitic diodes 2a, 4a, 6a, and 8a of the low-withstand-voltage transistors 2, 4, 6, and 8 operates as a freewheeling diode.

The source-drain withstand voltage of a transistor increases with greater distance between the source and the drain of the transistor. When the impurity concentration of the channel of a transistor is low, the source-drain withstand voltage of the transistor increases. When the impurity concentration within a parasitic diode is high, the minority carrier lifetime is shorter, and the recovery current is lower. Because the impurity concentration of the low-withstand-voltage transistors 2, 4, 6, and 8 is greater than the impurity concentration of the high-withstand-voltage transistors 1, 3, 5, and 7, the recovery current of the low-withstand-voltage transistors 2, 4, 6, and 8 is lower than the recovery current of the high-withstand-voltage transistors 1, 3, 5, and 7.

The drains of the transistors 1 and 5 both receive a power supply voltage VCC. The drains of the transistors 2 and 6 are respectively connected to the sources of the transistors 1 and 5, while the sources of the transistors 2 and 6 are respectively connected to output nodes N1 and N2. The drains of the transistors 3 and 7 are respectively connected to the output nodes N1 and N2. The drains of the transistors 4 and 8 are respectively connected to the sources of the transistors 3 and 7, and the sources of the transistors 4 and 8 are both connected to a ground voltage GND line. The transistors 1 and 2 constitute a left upper arm, the transistors 3 and 4 constitute a left lower arm, the transistors 5 and 6 constitute a right upper arm, and the transistors 7 and 8 constitute a right lower arm. A load 19 is connected between the output nodes N1 and N2.

The cathode of the diode 13 is connected to the gate of the transistor 1. The source of the transistor 9 is connected to the anode of the diode 13 and to the gate of the transistor 3. The output node of the gate power supply 15 is connected to the drain of the transistor 9. The gate power supply 15 outputs a DC voltage (for example, 0.2-50 V) that is higher than a voltage equal to the sum of the threshold voltage VTH of each of the high-withstand-voltage transistors 1 and 3 (for example, enhancement transistors of a threshold voltage VTH of 0.1-7 V), and the forward-direction step-down voltage of the diode 13.

The cathode of the diode 14 is connected to the gate of the transistor 5. The source of the transistor 10 is connected to the anode of the diode 14 and to the gate of the transistor 7. The output node of the gate power supply 16 is connected to the drain of the transistor 10. The gate power supply 16 outputs a DC voltage (for example, 0.2-50 V) that is higher than a voltage equal to the sum of the threshold voltage VTH of each of the high-withstand-voltage transistors 5 and 7 (for example, enhancement transistors with threshold voltage VTH of 0.1-7 V), and the forward direction step-down voltage of the diode 14.

The capacitor 11 is connected between the output node N1 and the gate of the transistor 1. The capacitor 12 is connected between the output node N2 and the gate of the transistor 5. The capacitor 11 is furnished in order to apply to the gate of the transistor 1a voltage equal to adding up the voltage of the output node N1 and the output voltage of the gate power supply 15. The capacitor 12 is furnished in order to apply to the gate of the transistor 5 a voltage equal to adding up the voltage of the output node N2 and the output voltage of the gate power supply 16. For example, when the output node N1 is at ground potential, the output potential of the gate power supply 15 is applied to the gate of the high-withstand-voltage transistor 1 via the transistor 9 and the diode 13. Thereafter, even when the potential of the output node N1 rises, due to capacitive coupling of the capacitor 11, a potential difference is maintained between the output node N1 and the gate of the high-withstand-voltage transistor 1. Analogously, a potential difference equal to the output voltage of the gate power supply 16 is maintained between the output node N2 and the gate of the high-withstand-voltage transistor 5.

The gates of the transistors 1 to 4 and 9 and the output node N1 are connected to the gate driver 17. The gates of the transistors 5 to 8 and 10 and the output node N2 are connected to the gate driver 18. The gate driver 17 and 18 control the gate voltages of the transistors 1 to 10 for on/off control of the transistors 1 to 10, and convert the DC power supply voltage VCC to AC voltage and supply the voltage to the load 19.

Next, the operation of the inverter will be described. In a case where the load 19 is to be supplied with AC power, the transistors 9 and 10 are turned on, and DC voltage greater than the threshold voltage VTH of the high-withstand-voltage transistors 1, 3, 5, and 7 is applied to the gate of each of the high-withstand-voltage transistors 1, 3, 5, and 7. In this state, firstly, the low-withstand-voltage transistors 2 and 8 are turned on. In so doing, the high-withstand-voltage transistors 1 and 7 are turned on as well, and electrical current flows from the power supply voltage VCC line to the ground voltage GND line via the transistors 1 and 2, the load 19, and the transistors 7 and 8. In a case where the load 19 is an inductive load, electromagnetic energy accumulates in the load 19.

Next, the low-withstand-voltage transistors 2 and 8 are turned off. In a case where the load 19 is an inductive load, due to the electromagnetic energy accumulated in the load 19, electrical current flows back from the ground voltage GND line to the power supply voltage VCC line via the parasitic diode 4a, the transistor 3, the load 19, the parasitic diode 6a, and the transistor 5.

Next, at the same time the freewheeling current disappears, the low-withstand-voltage transistors 4 and 6 are turned on. In so doing, the high-withstand-voltage transistors 3 and 5 are turned on as well, and electrical current flows from the power supply voltage VCC line to the ground voltage GND line via the transistors 5 and 6, the load 19, and the transistors 3 and 4.

Next, the low-withstand-voltage transistors 4 and 6 are turned off. In a case where the load 19 is an inductive load, due to the electromagnetic energy accumulated in the load 19, electrical current flows back from the ground voltage GND line to the power supply voltage VCC line via the parasitic diode 8a, the transistor 7, the load 19, the parasitic diode 2a, and the transistor 1. Subsequently, the load 19 is supplied with AC power in analogous fashion.

In a case where the supply of AC power to the load 19 is to be interrupted the transistors 9 and 10 are turned off, the gates of the transistors 1, 3, 5, and 7 are brought to "L" level, and the transistors 1, 3, 5, and 7 are turned off. The transistors 2, 4, 6, and 8 are fixed in the off state as well. Optionally, a single capacitor may be connected between the gates of the transistors 3 and 4, as well as connecting a single capacitor between the gates of the transistors 7 and 8. Optionally, the cathode and anode of a single diode may be respectively connected to the gates of the transistors 3 and 4, as well as respectively connecting the cathode and anode of a single diode to the gates of the transistors 7 and 8.

In this sort of inverter, in order to regulate the power supplied to the load 19, there are cases in which a chopping operation that involves turning on the upper left arm (the transistors 1 and 2) and turning on and off the lower right arm (the transistors 7 and 8), and a chopping operation that involves turning on the upper right arm (the transistors 5 and 6) and turning on and off the lower left arm (the transistors 3 and 4), are performed in alternating fashion.

Conversely, there are cases in which a chopping operation that involves turning on the lower right arm (the transistors 7 and 8) and turning on and off the upper left arm (the transistors 1 and 2), and a chopping operation that involves turning on the lower left arm (the transistors 3 and 4) and turning on and off the upper right arm (the transistors 5 and 6), are performed in alternating fashion.

Figure 2:
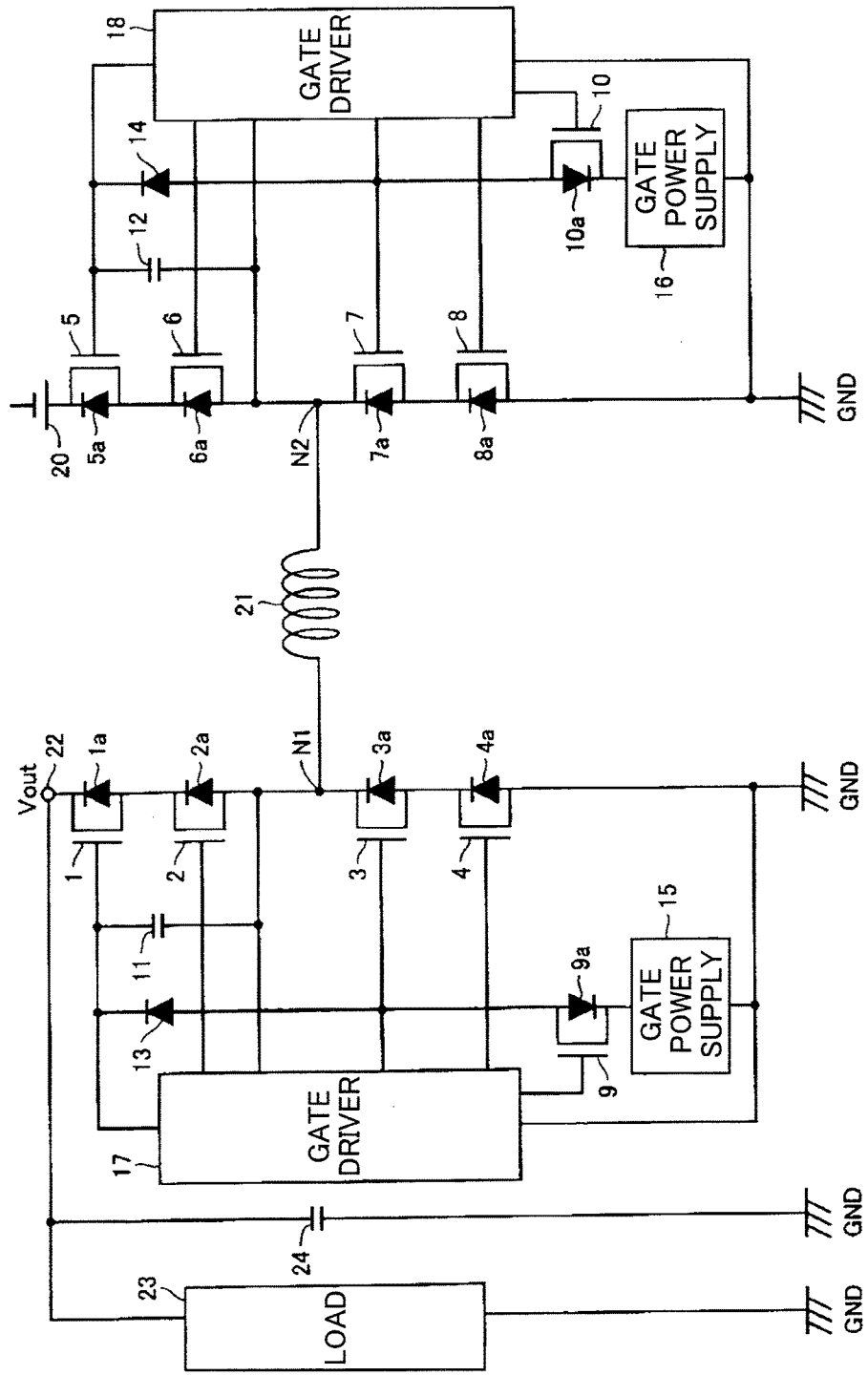
FIG. 2 is a circuit block diagram showing a configuration of a step-up chopper employing the inverter shown in FIG. 1.

In a case where such chopping operations are performed, recovery current becomes a problem. The inverter shown in FIG. 1 was operated as a step-up chopper, while measuring the recovery current and loss. FIG. 2 is a circuit block diagram showing the configuration of the step-up chopper. In the step-up chopper in FIG. 2, the output voltage (150 V) of a DC power supply 20 was applied to the drain of the transistor 5, and a coil 21 was connected between the output nodes N1 and N2. An output terminal 22 was connected to the drain of the transistor 1, and a load 23 and a capacitor 24 were parallel-connected between the output terminal 22 and the ground voltage GND line.

The transistors 9 and 10 were turned on, and DC voltage greater than the threshold voltage VTH of the high-withstand-voltage transistors was applied to the gate of each of the high-withstand-voltage transistors 1, 3, 5, and 7. The low-withstand-voltage transistors 2 and 8 were turned off, the low-withstand-voltage transistor 6 was turned on, and the low-withstand-voltage transistor 4 was turned on and off. That is, the upper right arm was turned on, and the lower left arm was turned on and off.

The operation of the step-up chopper will be described next. When the transistor 4 is turned on, electrical current flows from the DC power supply 20 to the ground voltage GND line via the transistors 5 and 6, the coil 21, and the transistors 3 and 4, and electromagnetic energy accumulates in the coil 21.

At this time, in the upper right arm, electrical current flows from the DC power supply 20 and towards the output node N2 (the downward direction in FIG. 2), and the transistor 5 and the transistor 6 are both in the on state. In the lower left arm, electrical current flows from the output node N1 and towards the ground voltage GND line (the downward direction in FIG. 2), and the transistor 3 and the transistor 4 are both in the on state.

Next, when the transistor 4 is turned off, electrical current ceases to flow to the transistor 4, but electrical current continues to flow from the coil 21, whereby the source voltage of the transistor 3 rises, and the transistor 3 assumes the off state. Because electrical current continues to flow from the coil 21 even after the transistors 3 and 4 are off, the source voltage of the transistor 2 rises. In association with the rise of the source voltage of the transistor 2, the voltage presented to the gate of the transistor 2 by the gate driver 17 rises as well, and the transistor 2 is maintained in the off state. When the source voltage of the transistor 2 becomes greater than the drain voltage, freewheeling current flows from the source of the transistor 2 to the drain of the transistor 2 via the parasitic diode 2a.

At this time, the source voltage of the transistor 1 is lower than the source voltage of the transistor 2. Moreover, due to capacitive coupling of the capacitor 11, the gate voltage of the transistor 1 is maintained at a voltage greater than the source voltage of the transistor 2 by the equivalent of the voltage generated by the gate power supply 15 (for example, 12 V), and therefore the transistor 1 enters the on state. Because of this, electrical current flows to the channel of the transistor 1, and electrical current flowing to the parasitic diode 1a is kept to a low level. The transistor 3 functions as a voltage step-down element for stepping down the source-drain voltage of the transistor 4.

At this time, electrical current flows from the DC power supply 20 to the output terminal 22 via the transistors 5 and 6, the coil 21, the parasitic diode 2a, and the transistor 1, and the electromagnetic energy of the coil 21 is released.

At this time, in the upper right arm, electrical current flows from the DC power supply 20 towards the output node N2 (the downward direction in FIG. 2), and the transistor 5 and the transistor 6 are both in the on state. In the upper left arm, electrical current flows from the output node N1 towards the output terminal 22 (the upward direction in FIG. 2), the transistor 1 is in the on state, and the transistor 2 is in the off state.

Next, when the transistor 4 is turned on, electrical current flows to the transistor 4, the source voltage of the transistor 3 drops, and the transistor 3 also enters the on state. Because of this, the transistors 3 and 4 turn on, the electrical current of the coil 21 begins to flow to the transistors 3 and 4, and the source voltage of the transistor 2 drops. When the source voltage of the transistor 2 drops to below the drain voltage, recovery current flows to the transistor 2, and at the same time or subsequently, recovery current flows to the transistor 1. Thereafter, once the source voltage of the transistor 2 has dropped sufficiently, electrical current flows from the DC power supply 20 to the ground voltage GND line via the transistors 5 and 6, the coil 21, and the transistors 3 and 4, and electromagnetic energy is accumulated in the coil 21. When the transistor 4 was turned on and off under the condition of a 50% duty ratio in this manner, the output voltage Vout of the step-up chopper was about 300 V.

The drain voltage Vd (V) and the drain current Id (A) of the transistor 3 were measured during operation of the step-up chopper. As a comparative example, there was prepared a conventional step-up chopper in which each arm is constituted solely by a high-withstand-voltage transistor. High-withstand-voltage transistors identical to those in the first embodiment were used in the comparative example. The step-up chopper of the comparative example was operated analogously to the first embodiment, while measuring the drain voltage Vd (V) and the drain current Id (A) of the high-withstand-voltage transistor of the lower left arm.

Figure 3:
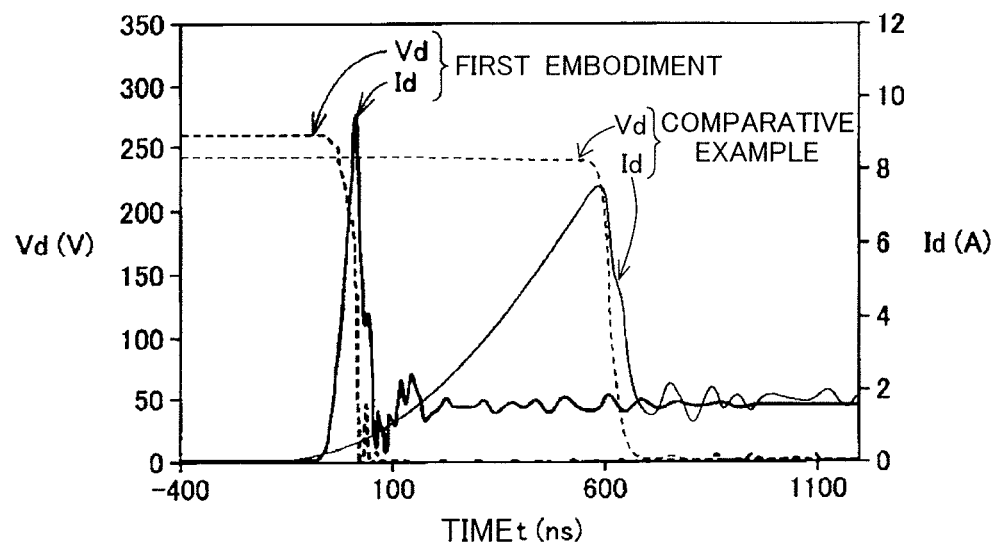
FIG. 3 is a time chart for describing the effect of the inverter shown in FIG. 1.
Figure 4:
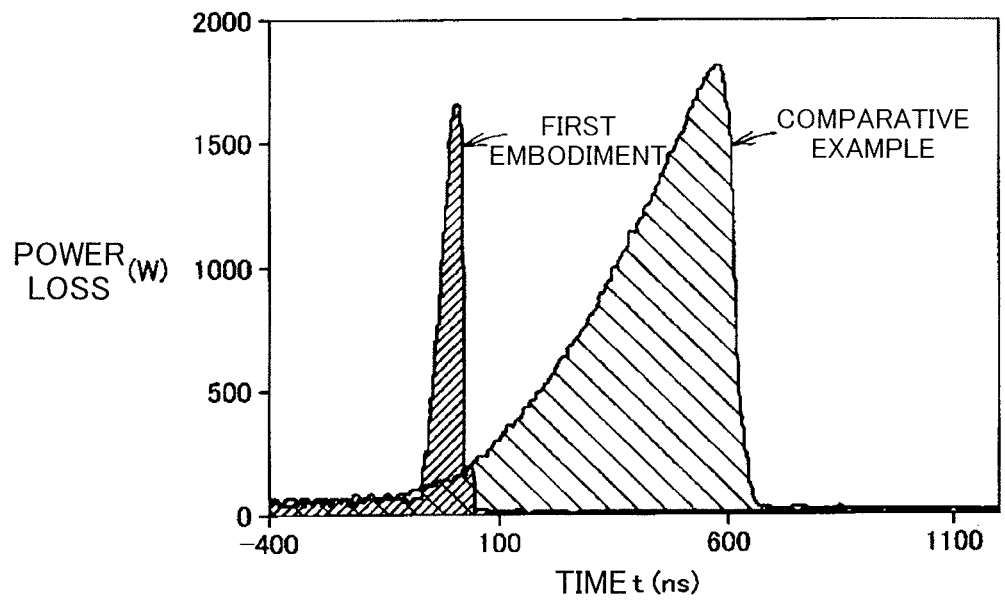
FIG. 4 is another time chart for describing the effect of the inverter shown in FIG. 1.

FIG. 3 is a diagram showing the results of the measurements. As a result, it will be appreciated that the charge quantity of the recovery current in the first embodiment is reduced to one-fifth of the charge quantity of the recovery current in the comparative example. Herein, the expression "reduction of recovery current" refers strictly to a reduction in the charge quantity of the recovery current. In FIG. 3, the peak value of the recovery current in the first embodiment exceeds the peak value of the recovery current in the comparative example. However, the time integration of the recovery current, specifically, the charge quantity of the recovery current, is overwhelmingly less in the first embodiment. FIG. 4 is a diagram showing power loss during switching. The areas of the sections indicated by diagonal lines show power loss occurring during switching a single time. It will be appreciated that power loss in the first embodiment is reduced to one-eighth the power loss in the comparative example. In the comparative example, the loss for the entire inverter was 4.1%, whereas in the first embodiment, the loss for the entire inverter was reduced to 1.3%.

The following may be postulated as a possible reason why these results were obtained. Specifically, because freewheeling current from the coil 21 flows to the parasitic diode 2a of the low-withstand-voltage transistor 2, when the transistor 4 turns on, recovery current flows to the low-withstand-voltage transistor 2, but the recovery current of the low-withstand-voltage transistor 2 is typically smaller than the recovery current of a high-withstand-voltage transistor. Moreover, in the first embodiment, freewheeling current from the coil 21 flows to the channel of the high-withstand-voltage transistor 1, the electrical current flowing to the parasitic diode 1a is small, and therefore the recovery current of the high-withstand-voltage transistor 1 is small. Expressed another way, in the upper left arm, because the transistor 1 was in the on state during flow of electrical current from the output node N1 towards the output terminal 22 (the upward direction in FIG. 2), the electrical current flowing to the parasitic diode 1a was small, and as a result, the recovery current of the high-withstand-voltage transistor 1 was small.

In contrast to this, in the comparative example, all of the freewheeling current from the coil flows to the parasitic diode of the high-withstand-voltage transistor of the upper left arm, and therefore when the lower left arm has turned on, a large recovery current flows to the high-withstand-voltage transistor. As a result, according to the first embodiment, the recovery current can be smaller, as compared with a conventional inverter constituted by high-withstand-voltage transistors only, and power loss can be can be smaller.

As shown in FIG. 3, in the first embodiment, the recovery current is small, and therefore the drain voltage Vd of the transistor 3 drops rapidly; whereas in the comparative example, the recovery current is large, and therefore the drop in drain voltage Vd of the transistor of the lower left arm is delayed. Moreover, in the first embodiment, when the drain voltage Vd of the transistor 3 drops from about 250 V, it pauses momentarily in the vicinity of 180 V. This is because the switching speed in the first embodiment is fast, giving rise to a 70 V voltage step down due to the parasitic inductance of the circuit.

In the first embodiment, there is no need to separately furnish a high-withstand voltage freewheeling diode, and therefore the device can be realized at lower cost, as compared with the prior art disclosed in Japanese Laid-Open Patent Application 7-264876 and Japanese Laid-Open Patent Application 2010-29019.

The withstand voltage between source and drain of the low-withstand-voltage transistors 2, 4, 6, and 8 is preferably within a range of 3-200 V. When the withstand voltage between source and drain of the low-withstand-voltage transistors 2, 4, 6, and 8 exceeds 200 V, the recovery current in the low-withstand-voltage transistors 2, 4, 6, and 8 increases. In cases in which the withstand voltage between source and drain of the low-withstand-voltage transistors 2, 4, 6, and 8 is less than 3 V, the tolerance of the low-withstand-voltage transistors 2, 4, 6, and 8 to noise of the power supply circuit drops.

The withstand voltage between source and drain of the high-withstand-voltage transistors 1, 3, 5, and 7 is preferably within a range of from three-fold to a hundred-fold the withstand voltage between source and drain of the low-withstand-voltage transistors 2, 4, 6, and 8. In cases in which the withstand voltage between source and drain of the high-withstand-voltage transistors 1, 3, 5, and 7 is less than three-fold the withstand voltage between source and drain of the low-withstand-voltage transistors 2, 4, 6, and 8, the difference between the recovery current of the high-withstand-voltage transistors and the recovery current of the low-withstand-voltage transistors will be small, and the effect of the first embodiment will be small. In cases where the withstand voltage between source and drain of the high-withstand-voltage transistors 1, 3, 5, and 7 is more than a hundred-fold the withstand voltage between source and drain of the low-withstand-voltage transistors 2, 4, 6, and 8, the tolerance of the low-withstand-voltage transistors to switching noise drops.

In the present embodiment, voltages greater than voltages obtained by adding the respective threshold voltages of the high-withstand-voltage transistors 1, 3, 5, and 7 to the respective source potentials of the low-withstand-voltage transistors 2, 4, 6, and 8 are applied to the gates of the high-withstand-voltage transistors 1, 3, 5, and 7. Because of this, potential difference between the source and drain of the high-withstand-voltage transistors 1, 3, 5, and 7 can be substantially eliminated. Consequently, the effect of reducing the recovery current of the high-withstand-voltage transistors 1, 3, 5, and 7 can be exhibited to the maximum extent.

In the present embodiment, the capacitors 11 and 12 are respectively connected between the gates of the high-withstand-voltage transistors 1 and 5 and the output nodes N1 and N2. Furthermore, the cathodes of the diodes 13 and 14 are respectively connected to the gates of the high-withstand-voltage transistors 1 and 5. The configuration is one whereby voltages greater than the respective threshold voltages of the high-withstand-voltage transistors 1 and 5 are applied to the anodes of the diodes 13 and 14. In so doing, even if the voltage of the output nodes N1 and N2 fluctuates while supplying AC power to the load 19, due to capacitive coupling by the capacitors 11 and 12, potential sufficient to turn on the high-withstand-voltage transistors 1 and 5 continues to be applied to the gates of the high-withstand-voltage transistors 1 and 5, and therefore the recovery current of the high-withstand-voltage transistors 1 and 5 can be reliably reduced.

Moreover, in the present embodiment, the configuration is one whereby the high-withstand-voltage transistors 1, 3, 5, and 7 can be turned off in a case where no power is supplied to the load 19. Therefore, even in a case where the gate driver 17 or 18 has malfunctioned, through-current flows to the transistors 1 to 4 or the transistors 5 to 8, preventing fire or explosion from occurring, and enhancing safety.

In more specific terms, the transistors 9 and 10 are respectively furnished between the diodes 13 and 14, and the gate power supplies 15 and 16 provided for the purpose of presenting voltage equal to or greater than the threshold voltage of the withstand transistors 1, 3, 5, and 7 to the gates of the high-withstand-voltage transistors 1, 3, 5, and 7. In a case where power is being supplied to the load 19, the transistors 9 and 10 are placed in the on state, and voltage sufficient to turn on the high-withstand-voltage transistors 1, 3, 5, and 7 is supplied. On the other hand, in a case where no power is being supplied to the load 19, the transistors 9 and 10 are placed in the off state, and the high-withstand-voltage transistors 1, 3, 5, and 7 are placed in the off state, ensuring safety.

Furthermore, in a case where no power is being supplied to the load 19, the potential at the gates of the high-withstand-voltage transistors 1 and 5 is stabilized at a potential close to the respective potential of the output nodes N1 and N2, through capacitive coupling of the capacitor 11. Therefore, the high-withstand-voltage transistors 1 and 5 can be prevented from turning on improperly due to a surge or the like, and safety can be further enhanced.

Through the use of the gate power supplies 15, 16 designed to output DC voltage in such a manner that the high-withstand-voltage transistors 1, 3, 5, and 7 are turned on in cases in which AC power is to be supplied to the load 19, while the high-withstand-voltage transistors 1, 3, 5, and 7 are turned off in cases in which supply of AC power to the load 19 is to be stopped, the need for the transistors 9 and 10 may be obviated.

Moreover, in cases in which other safety measures such as fuses, relays, or the like have been adopted, it is acceptable for the high-withstand-voltage transistors 1, 3, 5, and 7 to be constantly on. For example, a cell may be furnished in place of the transistors 9 and 10 and the gate power supplies, and the output voltage of the cell may be presented directly to the anodes of the diodes 13 and 14 and to the gates of the transistors 3 and 7.

Whereas the present first embodiment has described an inverter and a step-up chopper (non-isolated DC/DC converter) provided with arms comprising series-connected high-withstand-voltage transistors and low-withstand-voltage transistors, there are other possible configurations for switching power supply devices that employ the arms. Other switching power supply devices include isolated DC/DC converters, power factor correction (PFC) circuits, and the like.

Second Embodiment

Figure 5:
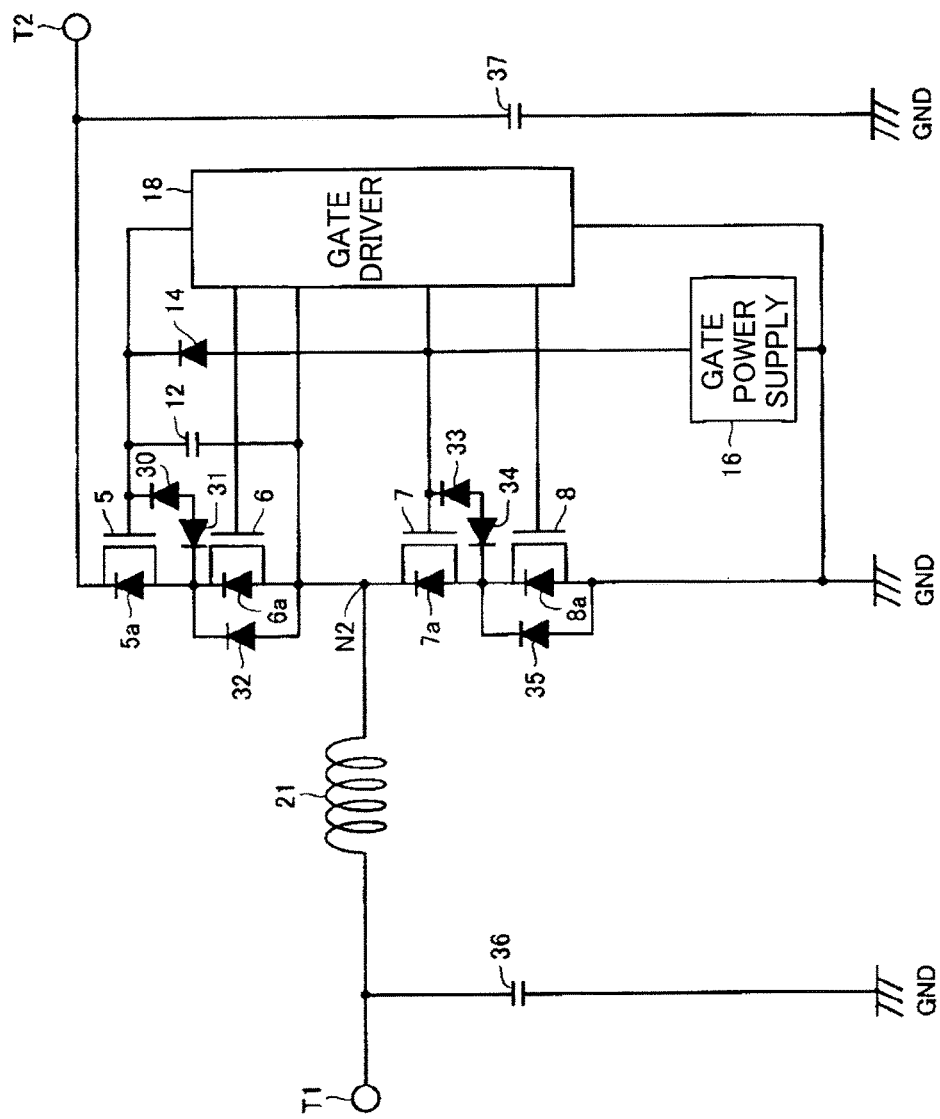
FIG. 5 is a circuit block diagram showing a configuration of a bidirectional chopper according to a second embodiment of this invention.

FIG. 5 is a circuit block diagram showing a configuration of a bidirectional chopper according to a second embodiment of this invention, and the diagram is intended for comparison with FIG. 2. In FIG. 5, bidirectional chopper is provided with the transistors 5 to 8, the capacitor 12, the diode 14, the gate power supply 16, the gate driver 18, and the coil 21 of the circuit of FIG. 2, as well as with diodes 30 to 35, capacitors 36 and 37, and input/output terminals T1 and T2.

The high-withstand-voltage transistor 5 and the low-withstand-voltage transistor 6 are serially connected between the input/output terminal T2 and the node N2. The high-withstand-voltage transistor 7 and the low-withstand-voltage transistor 8 are serially connected between the node N2 and the ground voltage GND line. The capacitor 12 is connected between the gate of the transistor 5 and the node N2. The cathode of the diode 14 is connected to the gate of the transistor 5, and the anode is connected to the gate of the transistor 7 and to the output node of the gate power supply 16. The gates of the transistors 5 to 8 and the node N2 are connected to the gate driver 18.

The anodes of the diodes 30 and 31 are connected to one another, and the cathodes thereof are connected respectively to the gate and source of the transistor 5. The diodes 30 and 31 are preferable zener diodes. Because the diodes 30 and 31 turn on when the gate-source voltage of the transistor 5 exceeds a predetermined voltage, the gate-source voltage of the transistor 5 can be limited to at or below the predetermined voltage, for stable operation of the circuit.

The anode and the cathode of the diode 32 are connected respectively to the source and the drain of the transistor 6. When the source-drain voltage of the transistor 6 exceeds the threshold voltage of the diode 32, the diode 32 turns on, whereby the source-drain voltage of the transistor 6 can be limited to or below the threshold voltage of the diode 32, and the circuit can be operated stably. The threshold voltage of the diode 32 is set to below the source-drain withstand voltage of the transistor 6. For the reason discussed below, it is preferable to employ a zener diode for the diode 32.

Analogously, the anodes of the diodes 33 and 34 are connected to one another, and the cathodes thereof are respectively connected to the gate and the source of the transistor 7. The diodes 33 and 34 are preferably zener diodes. When the gate-source voltage of the transistor 7 exceeds a predetermined voltage, the diodes 33 and 34 turn on, whereby the gate-source voltage of the transistor 7 can be limited to or below the predetermined voltage, and the circuit can be operated stably.

The anode and the cathode of the diode 35 are respectively connected to the source and the drain of the transistor 8. When the source-drain voltage of the transistor 8 exceeds the threshold voltage of the diode 35, the diode 35 turns on, whereby the source-drain voltage of the transistor 8 can be limited to or below the threshold voltage of the diode 35, and the circuit can be operated stably. The threshold voltage of the diode 35 is set to below the source-drain withstand voltage of the transistor 8. For the reason discussed below, it is preferable to employ a zener diode for the diode 35.

The coil 21 is connected between the input/output terminal T1 and the node N2. The capacitor 36 is connected between the input/output terminal T1 and the ground voltage GND line. The capacitor 37 is connected between the input/output terminal T2 and the ground voltage GND line.

Next, step-up operation by this bidirectional chopper will be described. In a case where, for example, 140 V is applied to the input/output terminal T1 and 280 V is output to the input/output terminal T2, DC voltage (for example, 12 V) greater than the threshold voltage VTH of the high-withstand-voltage transistors is applied to the gate of each of the high-withstand-voltage transistors 5 and 7. The low-withstand-voltage transistor 6 is turned off, while the low-withstand-voltage transistor 8 is turned on and off at a duty ratio (for example, 50%) dependent upon the boost ratio (two-fold).

When the transistor 8 turns on, electrical current flows from the input/output terminal T1 to the ground voltage GND line via the coil 21 and the transistors 7 and 8, and electromagnetic energy accumulates in the coil 21. Next, when the transistor 8 turns off, electrical current flows back from the coil 21 to the input/output terminal T2 via the parasitic diode 6a and the transistor 5, and the voltage of the input/output terminal T2 is stepped up. The voltage of the input/output terminal T2 reaches 280 V, which is higher than the voltage of the input/output terminal T1 (140 V).

When electrical current flows back from the coil 21 to the input/output terminal T2 via the parasitic diode 6a and the transistor 5, the transistor 8 is turned on, whereupon recovery current flows to the parasitic diode 6a of the low-withstand-voltage transistor 6. However, the recovery current of the low-withstand-voltage transistor 6 is smaller than the recovery current of the high-withstand-voltage transistors. Moreover, there is substantially no flow of freewheeling current to the parasitic diode 5a of the high-withstand-voltage transistor 5, and therefore the recovery current of the high-withstand-voltage transistor 5 is small as well. Consequently, recovery current is kept to a low level in the step-up operation.

When the transistor 8 is turned on, the potential of the node N2 drops. Thereupon, the potential of the gate of the transistor 5, which is capacitively coupled to the node N2 by the capacitor 12, drops as well. The transistor 6 enters the off state, and because the potential of the source of the transistor 5 is unchanged, the transistor 5 enters the off state. In this way, both of the transistors 5 and 6 enter the off state, and the potential of the source of the transistor 5 and the drain of the transistor 6 (the midpoint potential) is determined by capacitive coupling due to the surrounding parasitic capacitance. For this reason, as the potential of the node N2 continues to fall, a large voltage arises between the source and the drain of the low-withstand-voltage transistor 6. Where the diode 32 is a zener diode, the potential difference of the node N2 and the midpoint potential can be prevented from going above a constant value. The reverse-direction withstand voltage of the zener diode is preferably smaller than the source-drain withstand voltage of the transistor 6.

Analogously, where the diode 35 is a zener diode, when the transistor 8 is turned off, the difference between the ground potential and the potential of the source of the transistor 7 and the drain of the transistor 8 (the midpoint potential) can be limited. When the transistor 8 is turned off, the midpoint potential rises. Thereupon, due to the rise of the source potential of the transistor 7, the transistor 7 finally enters the off state. Both of the transistors 7 and 8 enter the off state, and the midpoint potential is determined by capacitive coupling due to the surrounding parasitic capacitance. For this reason, as the potential of the node N2 continues to rise, the midpoint potential rises as well due to capacitive coupling, and a large voltage arises between the source and the drain of the low-withstand-voltage transistor 8. Where the diode 35 is a zener diode, the potential difference of the ground potential and the midpoint potential can be prevented from going above a constant value. The reverse-direction withstand voltage of the zener diode is preferably smaller than the source-drain withstand voltage of the transistor 8.

From the preceding, it will be clearly understood that by employing zener diodes as the diodes 32, 35, the anodes of which are respectively connected to the sources of the low-withstand-voltage transistors 6 and 8, and the cathodes of which are respectively connected to the drains of the low-withstand-voltage transistors 6 and 8, the reliability of the low-withstand-voltage transistors 6 and 8 can be improved, recovery current can be reduced by lowering the withstand voltage of the low-withstand-voltage transistors 6 and 8, and furthermore, high efficiency of the switching power supply device can be attained.

Next, step-down operation by this bidirectional chopper will be described. In a case where, for example, 280 V is applied to the input/output terminal T2 and 140 V is output from the input/output terminal T1, DC voltage (for example, 12 V) greater than the threshold voltage VTH of the high-withstand-voltage transistors is applied to the gate of each of the high-withstand-voltage transistors 5 and 7. The low-withstand-voltage transistor 8 is turned off, while the low-withstand-voltage transistor 6 is turned on and off at a duty ratio (for example, 50%) dependent upon the boost ratio (two-fold).

When the transistor 6 turns on, electrical current flows from the input/output terminal T2 to the input/output terminal T1 via the transistors 5 and 6 and the coil 21, and electromagnetic energy accumulates in the coil 21. Next, when the transistor 6 turns off, electrical current flows back from the ground voltage GND line to the input/output terminal T1 via the parasitic diode 8a, the transistor 7, and the coil 21, and the voltage of the input/output terminal T1 is stepped down. The voltage of the input/output terminal T1 reaches 140 V, which is lower than the voltage of the input/output terminal T2 (280 V).

When electrical current flows back from the ground voltage GND line to the input/output terminal T1 via the parasitic diode 8a, the transistor 7, and the coil 21, the transistor 6 is turned on, whereupon recovery current flows to the parasitic diode 8a of the low-withstand-voltage transistor 8. However, the recovery current of the low-withstand-voltage transistor 8 is smaller than the recovery current of the high-withstand-voltage transistors. Moreover, there is substantially no flow of freewheeling current to the parasitic diode 7a of the high-withstand-voltage transistor 7, and therefore the recovery current of the high-withstand-voltage transistor 7 is small as well. Consequently, recovery current is kept to a low level in the step-down operation.

In the case of step-down operation as well, by employing zener diodes as the diodes 32, 35, the voltage between the source and drain of the low-withstand-voltage transistors 6 and 8 can be limited. Consequently, the reliability of the low-withstand-voltage transistors 6 and 8 can be improved, recovery current can be reduced by lowering the withstand voltage of the low-withstand-voltage transistors 6 and 8, and furthermore, high efficiency of the switching power supply device can be attained.

According to this second embodiment, as in the first embodiment, recovery current can be reduced, and power loss can be reduced. Moreover, because MOS transistors, rather than insulated gate bipolar transistors (IGBT) can be used as the high-withstand-voltage transistors 5 and 7, on-state power loss (conduction loss) of the high-withstand-voltage transistors can be reduced.

Whereas the unswitched low-withstand-voltage transistor 6 (or 8) is normally turned off and electrical current flows to the parasitic diode 6a (or 8a), there is no limitation thereto, and, optionally, synchronous rectification may be performed. In synchronous rectification, once electrical current begins to flow to the parasitic diode 6a (or 8a), the low-withstand-voltage transistor 6 (or 8) is turned on, and just prior to turning on the switched low-withstand-voltage transistor 8 (or 6), specifically, just prior to electrical current ceasing to flow to the low-withstand-voltage transistor 6 (or 8), the low-withstand-voltage transistor 6 (or 8) is turned off. In so doing, power loss can be reduced further.

Whereas this second embodiment has described a bidirectional chopper provided with arms comprising series-connected high-withstand-voltage transistors and low-withstand-voltage transistors, there are other possible configurations for unidirectional choppers that employ the arms.

Third Embodiment

Figure 6:
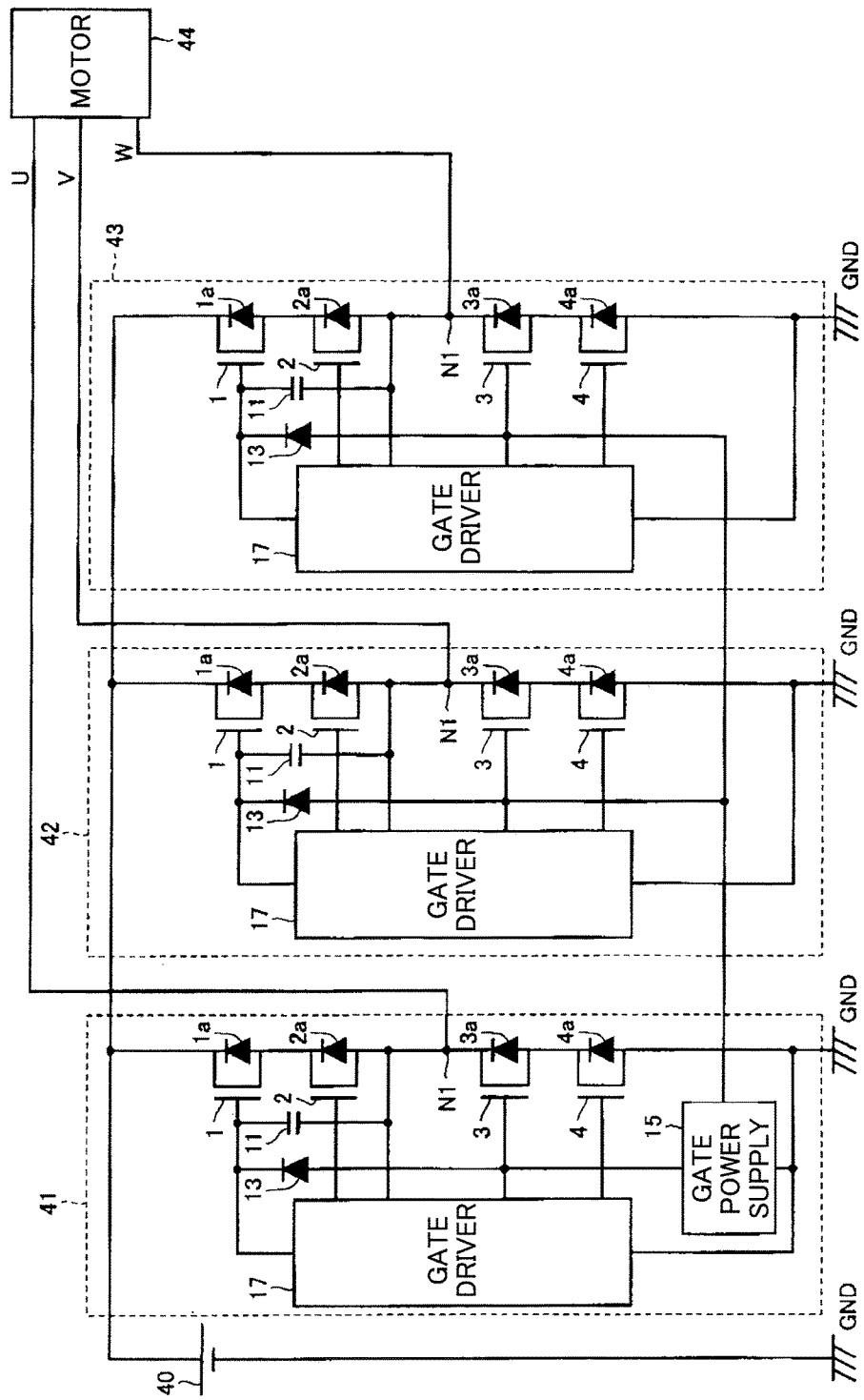
FIG. 6 is a circuit block diagram showing a configuration of a three-phase motor control inverter according to a third embodiment of this invention.

FIG. 6 is a circuit block diagram showing a configuration of a three-phase motor control inverter according to a third embodiment of this invention. In FIG. 6, the inverter is provided with a phase-U driver 41, a phase-V driver 42, and a phase-W driver 43.

The phase-U driver 41 includes the transistors 1 to 4, the capacitor 11, the diode 13, the gate power supply 15, and the gate driver 17 in the inverter shown in FIG. 1. The high-withstand-voltage transistor 1 and the low-withstand-voltage transistor 2 are serially connected between a DC power supply 40 and a node N1. The high-withstand-voltage transistor 3 and the low-withstand-voltage transistor 4 are serially connected between the node N1 and a ground voltage GND line. The node N1 is connected to a phase-U terminal (one of the terminals of the phase-U coil) of a motor 44.

The capacitor 11 is connected between the gate of the transistor 1 and the node N1. The cathode of the diode 13 is connected to the gate of the transistor 1, while the anode thereof is connected to the gate of the transistor 3 and the output node of the gate power supply 15. The gates of the transistors 1 to 4 and the node N1 are connected to the gate driver 17.

The phase-V driver 42 is equivalent to the phase-U driver 41 with the gate power supply 15 removed. The gates of the transistors 1 to 4 and the node N1 of the phase-V driver 42 are connected to the gate driver 17. The anode of the diode 13 is connected to the output node of the gate power supply 15 of the phase-U driver 41. The node N1 of the phase-V driver 42 is connected to a phase-V terminal (one of the terminals of the phase-V coil) of the motor 44.

The phase-W driver 43 is equivalent to the phase-U driver 41 with the gate power supply 15 removed. The gates of the transistors 1 to 4 and the node N1 of the phase-W driver 43 are connected to the gate driver 17. The anode of the diode 13 is connected to the output node of the gate power supply 15 of the phase-U driver 41. The node N1 of the phase-W driver 43 is connected to a phase-W terminal (one of the terminals of the phase-W coil) of the motor 44. The other terminals of the phase-U coil, the phase-V coil, and the phase-W coil of the motor 44 are connected to one another.

In this inverter, power is supplied to the motor 44 by a so-called 120-degree energizing method to drive the rotation of the rotor of the motor 44. In the 120-degree energizing method, the upper arms (the transistors 1 and 2) of the phase-U driver 41, the phase-V driver 42, and the phase-W driver 43 are sequentially turned on in 120-degree increments; and, at a delay of 180 degrees with respect thereto, the lower arms (the transistors 3 and 4) of the phase-U driver 41, the phase-V driver 42, and the phase-W driver 43 are sequentially turned on in 120-degree increments. In so doing, three-phase AC power is supplied to the motor 44 to drive the rotation of the rotor of the motor 44.

Next, a case in which electrical current is to flow from the DC power supply 40 to the ground voltage GND line via the upper arm of the phase-U driver 41, the motor 44, and the lower arm of the phase-V driver 42 will be described. In this case, a voltage (for example, 12 V) greater than the threshold voltage of the high-withstand-voltage transistors 1 and 3 is applied to the gates of the high-withstand-voltage transistors 1 and 3 of the drivers 41 and 42. The low-withstand-voltage transistor 4 of the phase-U driver 41 is turned off, the low-withstand-voltage transistor 2 of the phase-V driver 42 is turned off, and the low-withstand-voltage transistor 4 of the phase-V driver 42 is turned on. In this state, the low-withstand-voltage transistor 2 of the phase-U driver 41 is turned on and off.

When the low-withstand-voltage transistor 2 of the phase-U driver 41 is turned on, electrical current flows from the DC power supply 40 to the ground voltage GND line via the transistors 1 and 2 of the phase-U driver 41, the phase-U coil and the phase-V coil of the motor 44, and the transistors 3 and 4 of the phase-V driver 42.

Next, when the low-withstand-voltage transistor 2 of the phase-U driver 41 is turned off, electrical current continues to flow through the phase-U coil and the phase-V coil of the motor. Because of this, freewheeling current flows from the ground voltage GND line to the ground voltage GND line via the parasitic diode 4a and high-withstand transistor 3 of the phase-U driver 41, the motor 44, and the transistors 3 and 4 of the phase-V driver 42.

Figure 7:
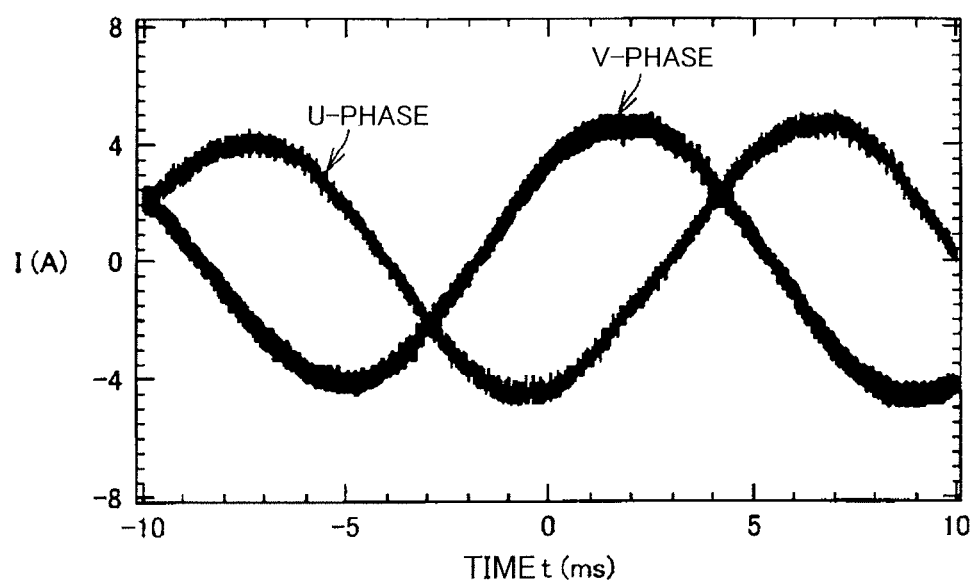
FIG. 7 is a time chart showing electrical current flowing to a motor from the three-phase motor control inverter shown in FIG. 6.

Analogously, through control of the three drivers 41 to 43, the motor 44 can be supplied with electrical current of sinusoidal form as shown in FIG. 7. In FIG. 7, for simplicity of illustration, only the waveform of the phase-U electrical current and the waveform of the phase-V electrical current are shown, omitting the waveform of the phase-W electrical current.

In this third embodiment, as in the first and second embodiments, recovery current can be reduced, reducing power loss.

Moreover, in this third embodiment, as in the second embodiment, MOS transistors can be used in place of IGBT as the high-withstand-voltage transistors 1 and 3, whereby on-state power loss (conduction loss) of the high-withstand-voltage transistors can be reduced. Optionally, synchronous rectification of the low-withstand-voltage transistors 2 and 4 may be performed analogously to the second embodiment.

Fourth Embodiment

Figure 8:
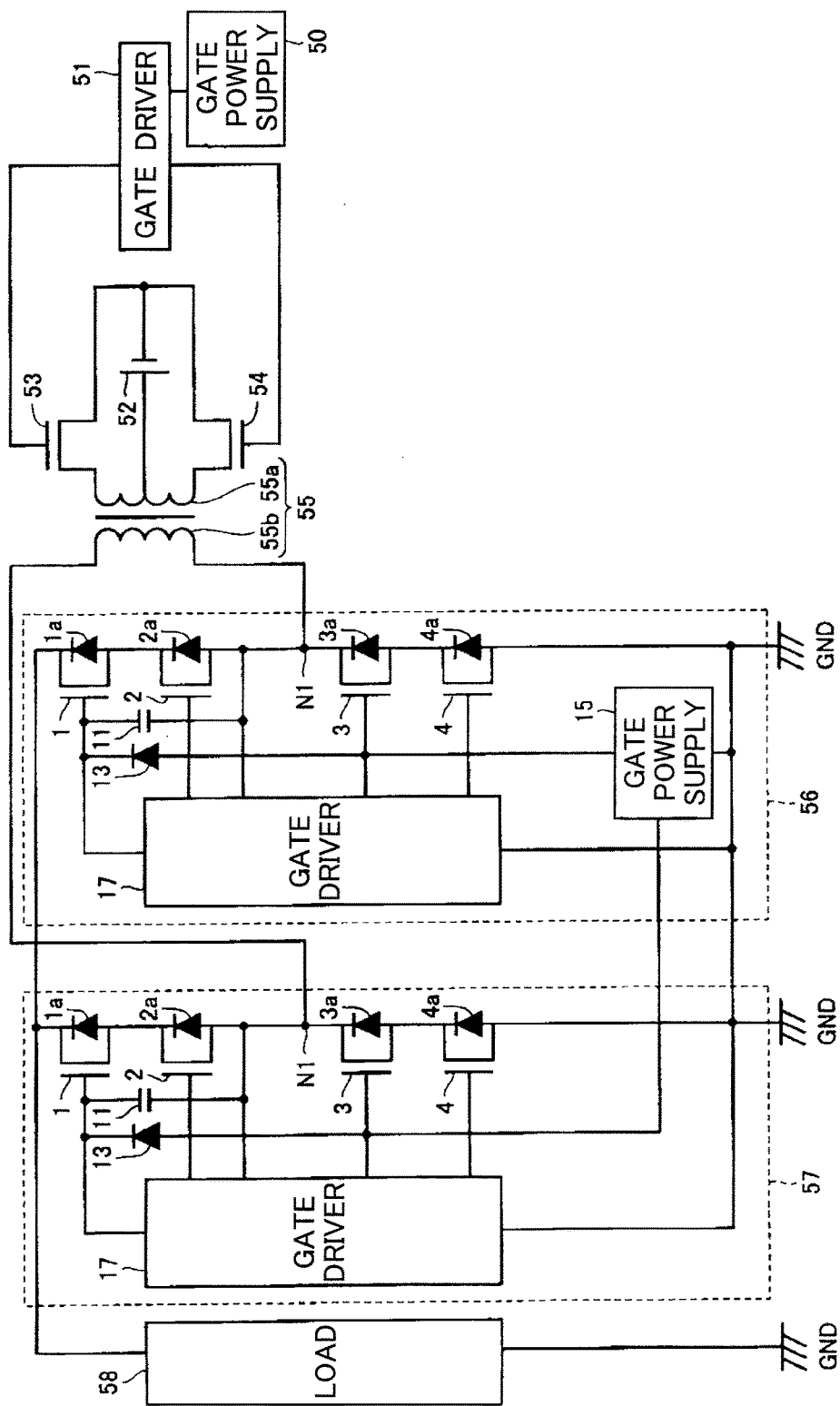
FIG. 8 is a circuit block diagram showing a configuration of a push-pull DC/DC converter according to a fourth embodiment of this invention.

FIG. 8 is a circuit block diagram showing a configuration of a push-pull DC/DC converter according to a fourth embodiment of this invention. In FIG. 8, the converter is provided with a gate power supply 50, a gate driver 51, a DC power supply 52, N-channel MOS transistors 53 and 54, a transformer 55, drivers 56 and 57, and a load 58.

The gate power supply 50 outputs a gate voltage. The transformer 55 includes a primary winding 55a and a secondary winding 55b. The positive electrode of the DC power supply 52 is connected to the midpoint of the primary winding 55a. The transistor 53 is connected between one terminal of the primary winding 55a and the negative electrode of the DC power supply 52. The transistor 54 is connected between the other terminal of the primary winding 55a and the negative electrode of the DC power supply 52. The gates of the transistors 53 and 54 are connected to the gate driver 51. The gate driver 51 presents the gate voltage from the gate power supply 50 in alternating fashion to the gates of the transistors 53 and 54. In so doing, the transistors 53 and 54 turn on in alternating fashion, and AC voltage is generated in the secondary winding 55b of the transformer 55.

The driver 56 includes the transistors 1 to 4, the capacitor 11, the diode 13, the gate power supply 15, and the gate driver 17 in the inverter shown in FIG. 1. The high-withstand-voltage transistor 1 and the low-withstand-voltage transistor 2 are series-connected between the load 58 and a node N1. The high-withstand-voltage transistor 3 and the low-withstand-voltage transistor 4 are series-connected between the node N1 and a ground voltage GND line. The node N1 is connected to one terminal of the secondary winding 55b of the transformer 55.

The capacitor 11 is connected between the gate of the transistor 1 and the node N1. The cathode of the diode 13 is connected to the gate of the transistor 1, while the anode thereof is connected to the gate of the transistor 3 and the output node of the gate power supply 15. The gates of the transistors 1 to 4 and the node N1 are connected to the gate driver 17.

The driver 57 is equivalent to the driver 56 with the gate power supply 15 removed. The gates of the transistors 1 to 4 and the node N1 of the driver 57 are connected to the gate driver 17. The anode of the diode 13 is connected to the output node of the gate power supply 15 of the driver 56. The node N1 of the driver 57 is connected to the other terminal of the secondary winding 55b of the transformer 55.

Next, the operation of this converter will be described. A DC voltage (for example, 12 V) greater than the threshold voltage VTH of the high-withstand-voltage transistors is applied to the gate of each of the high-withstand-voltage transistors 1 and 3 of the drivers 56 and 57. The low-withstand-voltage transistors 2 and 4 of the drivers 56 and 57 are turned off, and the transistors 53 and 54 are turned on in alternating fashion.

With the transistor 54 in the off state, when the transistor 53 is turned on, electrical current flows from the DC power supply 52 to the primary winding 55a of the transformer 55 and to the transistor 53, and positive voltage is induced in the secondary winding 55b of the transformer 55. In so doing, electrical current flows from the ground voltage GND line to the ground voltage GND line via the parasitic diode 4a and the high-withstand-voltage transistor 3 of the driver 56, the secondary winding 55b, the parasitic diode 2a and the high-withstand-voltage transistor 1 of the driver 57, and the load 58. Voltage of a value depending on the winding ratio of the transformer 55 is applied to the load 58.

Next, when the transistor 53 is turned off, the flow of electrical current from the DC power supply 52 to the primary winding 55a of the transformer 55 is interrupted, and the flow of electrical current to the secondary winding 55b is interrupted as well. At this time, charges flowing to the parasitic diode 4a of the driver 56 and to the parasitic diode 2a of the driver 57, as well as charges that have accumulated in parasitic capacitance of the circuit, now flow in the form of recovery current.

Next, with the transistor 53 in the off state, when the transistor 54 is turned on, electrical current flows from the DC power supply 52 to the primary winding 55a of the transformer 55 and to the transistor 54, and negative voltage is induced in the secondary winding 55b of the transformer 55. In so doing, electrical current flows from the ground voltage GND line to the ground voltage GND line via the parasitic diode 4a and the high-withstand-voltage transistor 3 of the driver 57, the secondary winding 55b, the parasitic diode 2a and the high-withstand-voltage transistor 1 of the driver 56, and the load 58. Voltage of a value depending on the winding ratio of the transformer 55 is applied to the load 58.

Next, when the transistor 54 is turned off, the flow of electrical current from the DC power supply 52 to the primary winding 55a of the transformer 55 is interrupted, and the flow of electrical current to the secondary winding 55b is interrupted as well. At this time, charges flowing to the parasitic diode 4a of the driver 57 and to the parasitic diode 2a of the driver 56, as well as charges that have accumulated in parasitic capacitance of the circuit, now flow in the form of recovery current.

In this fourth embodiment, there is substantially no flow of electrical current to the parasitic diodes 1a and 3a of the high-withstand-voltage transistors 1 and 3, and therefore recovery current can be appreciably reduced, and a high-efficiency converter can be realized.

Moreover, according to this fourth embodiment, as in the second embodiment, MOS transistors, rather than IGBT, can be used as the high-withstand-voltage transistors 1 and 3, and therefore on-state power loss (conduction loss) of the high-withstand-voltage transistors can be reduced. Optionally, synchronous rectification of the low-withstand-voltage transistors 2 and 4 may be performed analogously to the second embodiment.

Figure 9:
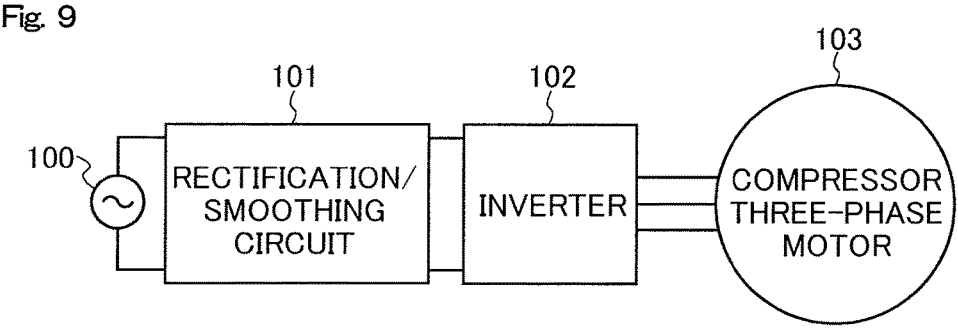
FIG. 9 is a diagram showing a simplified configuration example of an air conditioner.
Figure 10A:
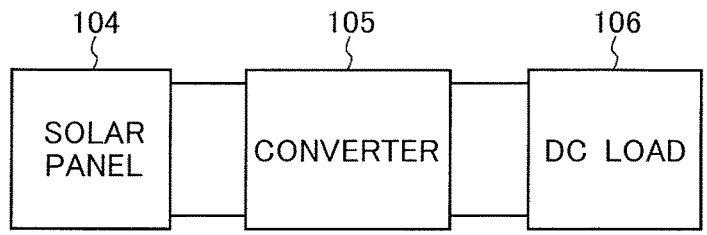
FIG. 10A and FIG. 10B are diagrams showing a simplified configuration example of a solar power controller.
Figure 10B:
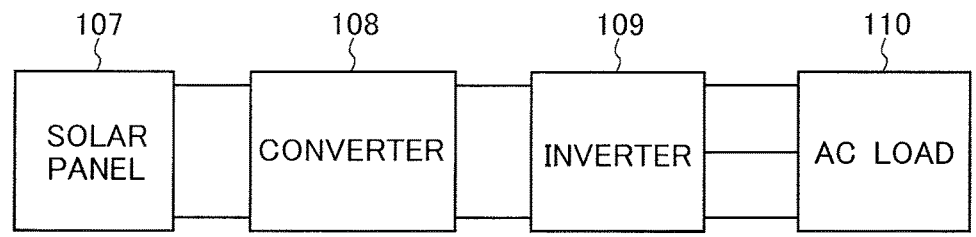
Figure 11:
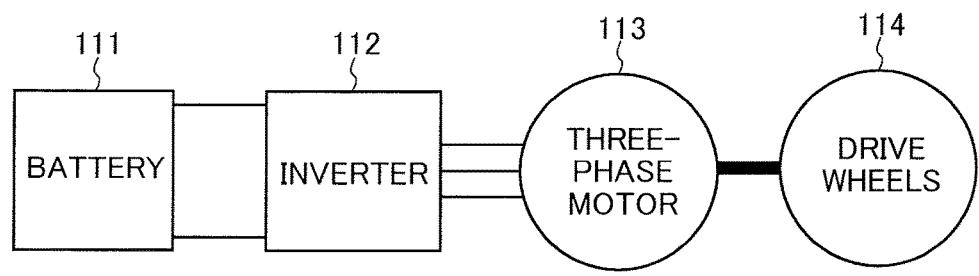
FIG. 11 is a diagram showing a simplified configuration example of an automobile.

It is possible for the switching power supply devices (inverters or converters) of the aforementioned first to fourth embodiments to be used in an air conditioner, a solar power controller, an automobile, or the like. By using the switching power supply devices (inverters or converters) of the aforementioned first to fourth embodiments in an air conditioner, a solar power controller, an automobile, or the like, high efficiency of the air conditioner, the solar power controller, the automobile, or the like can be attained. As in the configuration example shown in FIG. 9 for example, the air conditioner is provided with a rectification/smoothing circuit 101 for rectifying and smoothing the AC voltage output from a commercial AC power supply; an inverter 102 for converting the DC voltage output by the rectification/smoothing circuit 101 to three-phase AC voltage; and a compressor three-phase motor 103 for driving rotation by the three-phase AC voltage output by the inverter 102. As in the configuration example shown in FIG. 10A for example, the solar power controller may be provided with a solar panel 104 having a plurality of solar cells and a converter 105 for stepping up or stepping down the DC voltage output by the solar panel 104, with the DC voltage output by the converter 105 being supplied to a DC load (a load that receives the DC voltage; includes storage devices such as batteries and the like) 106. Or, as in the configuration example shown in FIG. 10B for example, the solar power controller may be provided with a solar panel 107 having a plurality of solar cells, a converter 108 for stepping up or stepping down the DC voltage output by the solar panel 107, and an inverter 109 for converting the DC voltage output by the converter 108 to three-phase AC voltage, with the three-phase AC voltage output by the inverter 109 being supplied to an AC load (a load that receives the three-phase AC voltage) 110. As in the configuration example shown in FIG. 11 for example, the automobile may be provided with a battery 111, an inverter 112 for converting the DC voltage output by the battery 111 to three-phase AC voltage, a three-phase motor 103 for driving rotation by the three-phase AC voltage output by the inverter 112, and drive wheels 114 linked to the rotating shaft of the three-phase motor 103. In the aforementioned examples, it is preferable for the converters 105 and 108 to have a maximum power point tracking (MPPT) control function for controlling the operating point of the solar panels 104 and 107 in such a way as to maximize the power generated by the solar panels 104 and 107. Moreover, whereas in the aforementioned examples, the inverters 102, 109, and 112 convert DC voltage to three-phase AC voltage, modification to a configuration in which DC voltage is converted to single-phase AC voltage is also possible, with the specifications of the motor and the AC load being modified depending on the modification.

The embodiments disclosed herein are in all aspects merely exemplary and should not be construed as limiting. The scope of the present invention is shown by the claims, rather than by the aforementioned description, and equivalents of the claims, as well as all modifications falling within the scope thereof, are intended for inclusion.

What is claimed is:

1. A switching power supply device, comprising:
a first transistor, a first electrode of which being connected to a first node;
a second transistor, a first electrode of which being connected to a second electrode of the first transistor, and a second electrode of which being connected to a second node; and
a drive circuit;
wherein each of the first and second transistors has a parasitic diode connected in the forward direction between the second and first electrodes;
wherein the withstand voltage between the first and second electrodes of the first transistor is higher than the withstand voltage between the first and second electrodes of the second transistor;
wherein the drive circuit, in a case where electrical current is to flow from the first node to the second node, turns on the first and second transistors, and in a case where electrical current is to flow from the second node to the first node, turns on the first transistor, and turns off the second transistor, and
wherein the drive circuit supplies a control electrode of the first transistor with a voltage that is higher than a voltage obtained by adding a threshold voltage of the first transistor to the voltage of the second node so as to turn on the first transistor.

2. The switching power supply device of claim 1, the drive circuit including:
a capacitor connected between the control electrode of the first transistor and the second node; and
a diode, a cathode of which being connected to the control electrode of the first transistor, and an anode of which receiving a voltage greater than the threshold voltage of the first transistor.

3. The switching power supply device of claim 1, the drive circuit turning on the first transistor when the switching power supply device is operated, and turning off the first transistor when the switching power supply device is idle.

4. The switching power supply device of claim 3, the drive circuit including:
a capacitor connected between the control electrode of the first transistor and the second node;
a diode, the cathode of which being connected to the control electrode of the first transistor; and
a third transistor, a first electrode of which receives a voltage greater than the threshold voltage of the first transistor, and a second electrode of which being connected to the anode of the diode; and the drive circuit, when the switching power supply device is operated, turning on the third transistor and turning on the first transistor; and, when the switching power supply device is idle, turning off the third transistor and turning off the first transistor.

5. The switching power supply device of claim 1, further provided with
a coil for accumulating and discharging electromagnetic energy,
one terminal of the coil being connected to the first or second node.

6. The switching power supply device of claim 1, further provided with
a transformer that includes primary and secondary windings,
one terminal of the primary winding being connected to the first or second node.

7. The switching power supply device of claim 1, further provided with
a zener diode, an anode of which being connected to the second electrode of the second transistor, and a cathode of which being connected to the first electrode of the second transistor.

8. A converter adapted to step up or step down DC voltage, provided with the switching power supply device of claim 1.

9. An inverter adapted to convert DC voltage to AC voltage, provided with the switching power supply device of claim 1.

10. An air conditioner, provided with the switching power supply device of claim 1.

11. A solar power controller, provided with the switching power supply device of claim 1.

12. An automobile, provided with the switching power supply device of claim 1.

13. The switching power supply device of claim 1, wherein the first transistor is an enhancement transistor.

14. A switching power supply device, comprising:
a first transistor, a first electrode of which being connected to a first node;
a second transistor, a first electrode of which being connected to a second electrode of the first transistor, and a second electrode of which being connected to a second node; and
a drive circuit;
wherein each of the first and second transistors has a parasitic diode connected in the forward direction between the second and first electrodes;
wherein the withstand voltage between the first and second electrodes of the first transistor is higher than the withstand voltage between the first and second electrodes of the second transistor;
wherein the drive circuit, in a case where electrical current is to flow from the first node to the second node, turns on the first and second transistors, and in a case where electrical current is to flow from the second node to the first node, turns on the first transistor, turns on the second transistor when electrical current has begun to flow from the second node to the first node, and turns off the second transistor before electrical current ceases to flow from the second node to the first node, and
wherein the drive circuit supplies a control electrode of the first transistor with a voltage that is higher than a voltage obtained by adding a threshold voltage of the first transistor to the voltage of the second node so as to turn on the first transistor.

15. A converter adapted to step up or step down DC voltage, provided with the switching power supply device of claim 14.

16. An inverter adapted to convert DC voltage to AC voltage, provided with the switching power supply device of claim 14.

17. The switching power supply device of claim 14, wherein the first transistor is an enhancement transistor.

18. A switching power supply device, comprising:
a first transistor, a first electrode of which being connected to a power supply voltage line;
a second transistor, a first electrode of which being connected to a second electrode of the first transistor, and a second electrode of which being connected to an output node;
a third transistor, a first electrode of which being connected to the output node;
a fourth transistor, a first electrode of which being connected to a second electrode of the third transistor, and a second electrode of which being connected to a reference voltage line; and
a drive circuit;
wherein each of the first to fourth transistors has a parasitic diode connected in the forward direction between the second and first electrodes;
wherein the withstand voltage between the first and second electrodes of the first transistor is higher than the withstand voltage between the first and second electrodes of the second transistor;
wherein the withstand voltage between the first and second electrodes of the third transistor is higher than the withstand voltage between the first and second electrodes of the fourth transistor;
wherein the drive circuit, in a case where electrical current is to flow from the power supply voltage line to the output node, turns on the first and second transistors, in a case where electrical current is to flow from the output node to the power supply voltage line, turns on the first transistor, and turns off the second transistor, in a case where electrical current is to flow from the output node to the reference voltage line, turns on the third and fourth transistors, and in a case where electrical current is to flow from the reference voltage line to the output node, turns on the third transistor, and turns off the fourth transistor, and
the drive circuit supplies a control electrode of the first transistor with a voltage that is higher than a voltage obtained by adding a threshold voltage of the first transistor to the voltage of the output node so as to turn on the first transistor.

19. The switching power supply device of claim 18,
the drive circuit including:
a capacitor connected between the control electrode of the first transistor and the output node; and
a diode, a cathode of which being connected to the control electrode of the first transistor, and an anode of which being connected to the control electrode of the third transistor; and
the anode of the diode receiving a voltage that is higher than individual threshold voltages of the first and third transistors.

20. A converter adapted to step up or step down DC voltage, provided with the switching power supply device of claim 18.

21. An inverter adapted to convert DC voltage to AC voltage, provided with the switching power supply device of claim 18.

22. The switching power supply device of claim 18, wherein the first transistor is an enhancement transistor.

\* \* \* \* \*